United States Patent [19]

Crowley

[11] Patent Number: 4,970,444

[45] Date of Patent: Nov. 13, 1990

[54] BRIGHTNESS CONTROL CIRCUIT FOR C.R.T.

[75] Inventor: Gregory T. B. Crowley, Whitby, Canada

[73] Assignee: U. S. Philips Corporation, New York, N.Y.

[21] Appl. No.: 301,007

[22] Filed: Jan. 23, 1989

[30] Foreign Application Priority Data

Jan. 28, 1988 [CA] Canada .................................. 557603

[51] Int. Cl.[5] ........................ G09G 1/04; H04N 5/235

[52] U.S. Cl. ..................................... 315/383; 358/168

[58] Field of Search ............... 315/383, 381, 379, 387, 315/389; 358/168

[56] References Cited

U.S. PATENT DOCUMENTS 3,201,513 8/1965 Schreiner ........................... 358/168

*Primary Examiner*—Gregory C. Issing

*Attorney, Agent, or Firm*—Edward W. Goodman

[57] ABSTRACT

A cathode ray tube brightness control circuit includes a resistor bridge network in one arm of which is a controlled voltage level point and the other arm of which includes a brightness adjustment potentiometer. A negative feedback amplifier has its input connected to the voltage level point and its output to one end of the bridge across which a brightness control voltage supply is connected. The voltage of the supply may be adjusted to vary the range of brightness control.

10 Claims, 1 Drawing Sheet

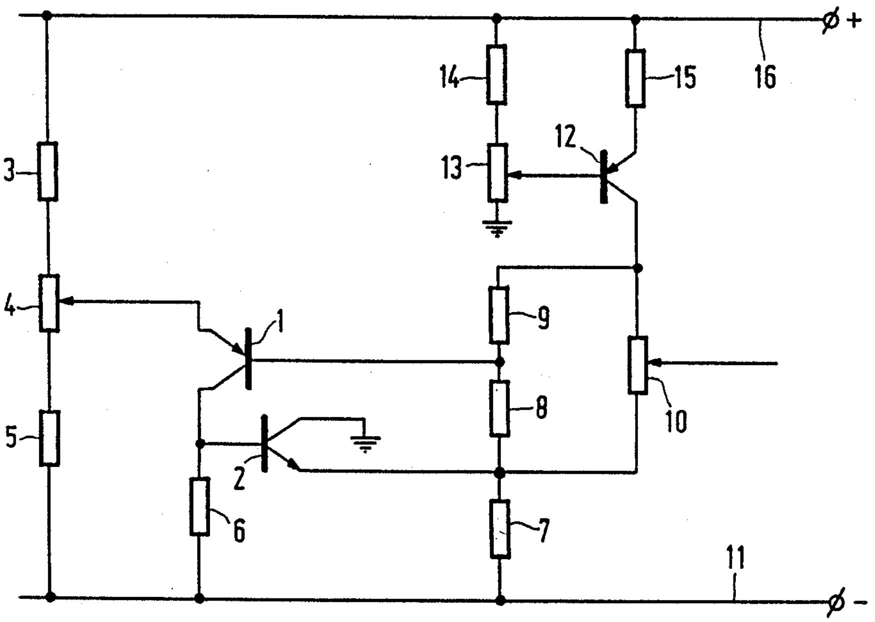
+
16
14
15
12
3
13
4
1
9
10
8
5
2
6
7
11
-

BRIGHTNESS CONTROL CIRCUIT FOR C.R.T.

BACKGROUND OF THE INVENTION

The present invention relates to brightness control circuits for cathode ray tube display units, more particularly to such circuits suitable for use in high quality video display units.

In brightness control circuits, for video display units, especially for graphics, it is desirable to provide a circuit wherein change of brightness by manual control adjustment control does not upset or change the cathode ray tube current cut-off point insofar as it coincides with a predetermined position of the brightness control. It is desirable to be able to adjust display brightness, for instance to accommodate video signals having a greater amplitude, without changing the current cutoff point or the black level control point.

Prior Art

It is known to adjust the range of a brightness control to the C.R.T. current cut-off point by means of a prefixed control usually not accessible from the exterior of a video display unit. However, in such known circuits it is not possible to adjust the range of brightness control without changing the position of the brightness control that coincides with the C.R.T. current cut-off voltage.

Objects of the Invention

It is, accordingly, a prime object of the present invention to provide a brightness control circuit wherein the brightness control range may be changed without changing the cathode ray tube current cut-off point as it relates to a predetermined position of the brightness control.

It is a further object of the invention to provide a brightness control circuit in which the cathode ray tube current cut-off point of the brightness control is maintained in a voltage regulated manner.

Summary of the Invention

In accordance with the invention the brightness control element, for instance a potentiometer, is included in a bridge circuit in which a voltage level at a point in the bridge, is maintained constant by a regulating circuit whereby the control element includes, in its voltage range of adjustment, the same voltage level or a point of fixed reference. The voltage level at the maintained level point is adjustable by means of control of the regulating circuit so that the brightness control adjustment is with respect to the maintained level.

In addition, the circuit of the invention provides that the range of brightness control can be varied without affecting the maintained voltage level point.

Brief Description of the Drawings

The single figure of the drawing shows a brightness control circuit according to the invention wherein elements not necessary for an understanding are omitted.

Description of the Preferred Embodiment

An NPN transistor 2 has its base connected to the junction of the collector of transistor 1 and resistor 6. The collector of transistor 2 is connected to a ground point and the emitter thereof to the lower end of a bridge circuit having resistors 8, 9 in one arm thereof and a potentiometer 10, the brightness control, in the other arm. The lower end of the bridge is connected through resistor 7 to the negative line 11. The upper end of the bridge is connected through the collector emitter circuit of a PNP current supply transistor 12 and resistor 15 to line 16. The base of transistor 12 is supplied with an adjustable voltage by means of resistor 14 and potentiometer 13 connected between line 16 and ground as shown. The tap of potentiometer 10 is connected through a resistor to the control grid of a cathode ray tube, the brightness of which is to be controlled.

Referring to the figure of the drawing a first transistor 1 is shown having its emitter connected to the tap of a potentiometer 4 connected in series with resistors 3, 5 between a positive supply conductor 16 and a negative supply conductor 11. The collector of PNP transistor 1 is connected through a load resistor 6 to the conductor 11.

Operation of the Circuit

It will be noted that the circuitry of transistors 1 and 2 constitute a negative feedback or voltage regulating system. The function of potentiometer 4, to vary voltage across these two transistors, is obvious.

The voltage across the bridge circuit 8,9,10 is the difference between the collector voltage of adjustable constant current source transistor 12 and the emitter voltage of transistor 2 and it is assumed that no current flows to the cathode ray tube control grid.

The base voltage of transistor 1 represents the controlled voltage line point of the bridge. If the voltage at this point tends to change an offsetting voltage is produced at the lower end of the bridge by change of current in transistor 2 controlled through transistor 1 due to any change on its base. Thus it will be seen that the controlled level will be maintained once set but may be adjusted by potentiometer 4. Due to the bridge configuration a controlled voltage level will exist at a point in the range of potentiometer 10 corresponding to the junction of resistors 8 and 9. It will be obvious that resistors may be added in the bridge arms to relocate the voltage level point as desired with respect to potentiometer 10 and, further, that adjustment of potentiometer 10 will not vary this location once set, hence the level point may be relocated readily and this point is generally that voltage which provides cathode ray tube current cut-off.

If it is desired to change the range of the brightness control this is carried out by adjustment of potentiometer 13 which varies the voltage at the collector of current source transistor 12, a change in voltage will appear across the bridge circuit simultaneously. However, due to the negative feedback configuration of the circuitry associated with transistors 1 and 2 the voltage at the lower end of the bridge will vary to offset the change at the top end of the bridge so that the voltage level point is maintained even though the overall brightness control range is varied.

Although a preferred embodiment of the invention is shown it will be obvious that modifications may be made, by those skilled in the art, which do not depart from the spirit and scope of the invention as defined in the appended claims. For instance, integrated circuits may replace discrete components such as those constituting the negative feedback arrangement comprising transistors 1 and 2.

Furthermore, transistor 12 and associated circuitry may be replaced by an integrated circuit.

I claim:

1. A cathode ray tube brightness control circuit comprising a resistor bridge network having a controlled voltage level point in one arm thereof and a brightness control potentiometer for a cathode ray display tube in the other arm, and voltage control means for the controlled voltage level point controlling the voltage across the resistor bridge network so that the voltage at the controlled voltage level point is maintained constant at a set value, a brightness voltage supply being connected to the resistor bridge network.

2. The circuit as claimed in claim 1, wherein the said voltage control means is constituted by a negative feedback amplifier the input of which is connected to the controlled voltage level point and the output to one end of the resistor bridge network.

3. The circuit as claimed in claim 1 or 2, wherein the voltage across the resistor bridge network is adjustable to provide a variable brightness control range for the brightness control potentiometer.

4. A cathode ray tube brightness control circuit comprising a resistor bridge network having a brightness control potentiometer in one arm thereof and a controlled voltage level point in the other arm, a negative feedback amplifier controlling the voltage level of one end of the resistor bridge network, and means connecting the controlled voltage level point to the negative feedback amplifier thereby causing the negative feedback amplifier to produce an offsetting voltage for said one end of the resistor bridge network to neutralize a tendency of the voltage at said controlled voltage level point to change.

5. A cathode ray tube brightness control circuit as claimed in claim 1 or 4, wherein means are provided for adjusting the voltage across said resistor bridge network in order to vary the range of the brightness control potentiometer.

6. A cathode ray tube brightness control circuit as claimed in claim 1 or 4, wherein a controllable constant current device is included in series with the resistor bridge network and acts as a means for substantially maintaining constant the voltage applied to the bridge.

7. A cathode ray tube brightness control circuit as claimed in claim 4 wherein the negative feedback amplifier comprises first and second transistors of opposite conductivity type connected in a direct current amplifier arrangement, in which an input electrode of the first transistor is direct current connected to the controlled voltage level point and an output electrode of the second transistor is direct current connected to said one end of the resistor bridge network, and an adjustable voltage supply for said direct current amplifier arrangement by means of which the voltage can be adjusted at said one end of the resistor bridge network.

8. A cathode ray tube brightness control circuit comprising:

- a brightness control potentiometer coupled to said cathode ray tube for applying an output voltage to said cathode ray tube for adjusting a current also applied thereto, a control element of said brightness control potentiometer changing a physical position thereof corresponding to a change in said voltage;
- means for varying a range of brightness control of said brightness control potentiometer; and
- means for maintaining constant a correspondence between the physical position of said control element and an output voltage of said potentiometer for providing current cut-off of said cathode ray tube when said brightness control range is varied by said varying means.

9. A brightness control circuit as claimed in claim 8, wherein said maintaining means comprises:

- a resistor bridge circuit having a first leg containing said brightness control potentiometer, and a second leg having a voltage control point therein; and
- a negative feedback amplifier having an input coupled to said voltage control point and an output coupled to one end of the resistor bridge circuit, and said varying means comprises a variable voltage supply coupled to the other end of the resistor bridge circuit, whereby when said variable voltage supply varies the voltage applied to said other end of said resistor bridge circuit, said negative feedback amplifier maintains the voltage at said voltage control point constant by correspondingly varying the voltage at said one end of the resistor bridge circuit, thereby the physical position of said control elements at which said brightness control potentiometer provides said current cut-off voltage is maintained constant.

10. A brightness control circuit as claimed in claim 9, wherein the negative feedback amplifier comprises:

- first and second transistors of opposite conductivity type connected in a direct current amplifier arrangement, said direct current amplifier arrangement having an input electrode of the first transistor direct current connected to the voltage control point and an output electrode of said second transistor direct current connected to said one end of the resistor bridge circuit; and
- a first adjustable voltage supply for said direct current amplifier arrangement for adjusting the voltage at said one end of said resistor bridge circuit.

* * * * *